UNITED STATES PATENT OFFICE.

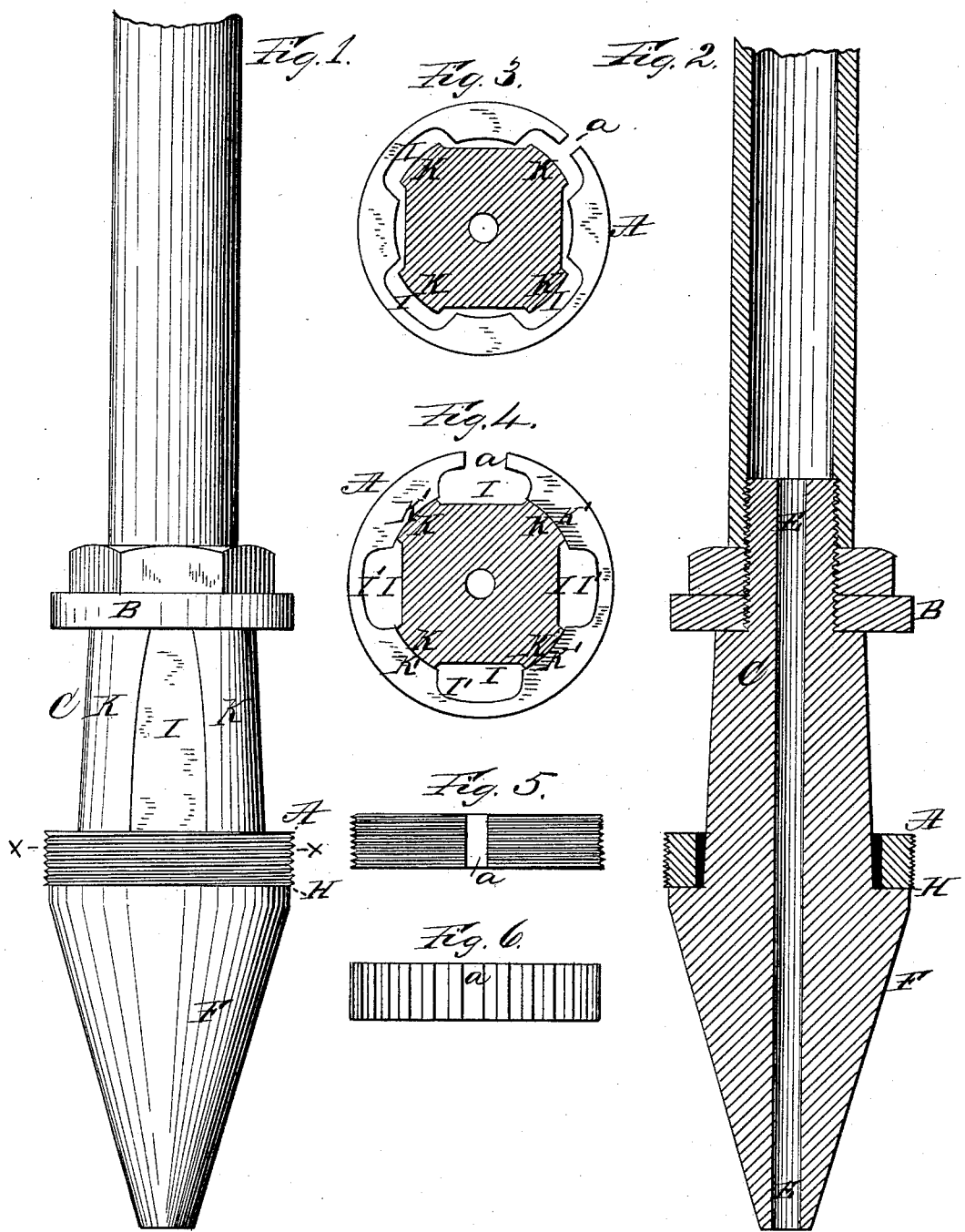

HENRY C. REICHARDT, OF POTTSVILLE, PENNSYLVANIA.

TUBE-CLAMP FOR ARTESIAN WELLS.

SPECIFICATION forming part of Letters Patent No. 342,462, dated May 25, 1886.

Application filed October 1, 1884. Serial No. 144,488. (No model.)

*To all whom it may concern:*

Be it known that I, HENRY C. REICHARDT, of Pottsville, Schuylkill county, Pennsylvania, have invented a new and useful Improvement in Tube-Clamps for Artesian Wells, of which the following is such a full, clear, and exact description as will enable others skilled in the art to make and use the same, when taken in connection with the accompanying drawings, in which—

Figure 1 is a face view of the clamp. Fig. 2 is a longitudinal vertical section of the clamp, showing the ring in its lowest position. Fig. 3 is a horizontal section of the mandrel and ring at x x of Fig. 1. Fig. 4 is a horizontal section showing the ring expanded by the mandrel. Figs. 5 and 6 are face views of rings.

This my invention relates to a new and improved apparatus for clamping tubes or pipes is to be used in raising tubes in Artesian wells or other deep drill-holes; and it consists of a cut ring combined with an expanding-mandrel, and the various combinations hereinafter specified and claimed.

The ring A is made of a size to fit the inside of the pipe to be held, and is cut through at $a$, as shown. The outside of the ring is made with a rough or biting surface—that is, when the pipe is to be held against longitudinal pull. The ring has concentric grooves or ribs on its circumferential surface, or when the pipe is to be held against turning. The surface of the rings is provided with projecting teeth. The surface of the first is shown in Fig. 5 and of the latter in Fig. 6.

The mandrel is made so that it may be firmly attached at the end of a rod or pipe, in which manner it is usually used.

The mandrel C consists of the bar or rod formed with a water-way, E, through its center, having a shoulder, H, near its lower end, and preferably a tapering point, F, below the shoulder. The mandrel tapers gradually from above the shoulder H upward to the upper end of its surface, and in the surface of the mandrel are cut grooves I I I I, two, three, or more in number, and in width a little wider than the remaining lands K between them. The bottoms of the grooves I are made straight, so that they are all parallel to one another. At the top of the operative face of the mandrel is fixed the collar B, to force the ring A down when the mandrel is inserted in a pipe, as hereinafter described.

The inside of the ring is cut away at two, three, or more places, agreeing in number with the number of grooves in the mandrel with which it is to be used. The cut-away portions or notches I′ I′ I′ are greater in extent than the remaining lands K′ K′ left between them.

The mandrel C and the ring A are so proportioned in size with one another that when they are so turned in relation to one another that the lands K′ of the ring enter the grooves I I of the mandrel, as shown in Fig. 3, the ring will be free to slide up and down the mandrel between the shoulder H and the collar B, and that when the mandrel is turned so that the lands of the ring and the lands of the mandrel are opposite one another, as shown in Fig. 4, the ring will pass freely about the upper portion of the mandrel, near the collar B; but when the mandrel is pulled or forced up the gradual increase in diameter of the mandrel on the surface of the land will prevent the ring A from coming against the shoulder H, and when force is applied in pulling the mandrel the ring A will be expanded by wedge action of the lands of the mandrel.

The mode of operation is as follows: A ring, A, of a size to just fit in the pipe to be clamped and a mandrel of sufficient size to expand it when the lands of the mandrel and the ring are brought together, are used. They are turned so that the lands of the ring are in the grooves of the mandrel, and are then inserted in the pipe, the little force necessary to move the ring down being applied by the collar B. When the ring has been put in the pipe to the desired place, the mandrel is turned a quarter or a third of a turn, according as there are four or three lands on the ring and mandrel, so as to bring the lands of the ring and of the mandrel together or opposite one another, when the mandrel is withdrawn sufficiently to make the taper or wedge shape of the lands of the mandrel force the ring outward against the inside of the pipe. The more pull put on the mandrel the greater the pressure exerted on the inside of the pipe by the ring A.

This tube-clamp is intended to be used in raising tubes from Artesian wells or from any hole made by a drill, and may be applied to the removal of tubular drill-rods, which may have become detached or broken in the drill-hole, or to any other like purpose.

When it is desired to withdraw the ring and mandrel, it is only necessary to again turn the mandrel, so that the lands of the ring will be in the grooves of the mandrel, and the ring will cease to press against the sides of the pipe, and the pipe-clamp may be moved up or down in the pipe and made to grip at any desired point by simply turning the mandrel so that the lands press on the inside of the ring, when it is withdrawn or attempted so to be.

I am aware that tools have been made in which mandrels wedge-shaped on two sides thereof operate to force pieces fitted to them outward against an encircling pipe when the mandrel is drawn back; but with such device it is necessary to withdraw it from the tube to set it to operate, and it cannot be made to "grip" or not grip at will without withdrawing it.

What I claim as new, and desire to secure by Letters Pattent, is—

1. The combination, in a pipe-clamp, of a cut ring and tapering mandrel, substantially as specified and set forth.

2. The combination, in a pipe-clamp, of a cut ring on a tapering mandrel between the shoulder H and collar B of the mandrel, substantially as specified.

3. The combination, in a pipe-clamp, of a cut ring having the internal notches and lands, with a mandrel having grooves and tapering lands, substantially as specified and set forth.

4. The combination, in a pipe-clamp, of a cut ring having internal notches and lands on a mandrel having grooves and tapering lands between a shoulder and collar, substantially as specified and set forth.

HENRY C. REICHARDT.

Witnesses:
ROBT. SUMMERS,
W. V. CARR.